United States Patent
Kismarton (10) Patent No.: US 7,780,409 B2
(45) Date of Patent: Aug. 24, 2010

(54) ROTOR APPARATUS AND METHODS FOR VERTICAL LIFT AIRCRAFT

(75) Inventor: Max U. Kismarton, Renton, WA (US)

(73) Assignee: The Boeing Company, Chicago, IL (US)

(*) Notice: Subject to any disclaimer, the term of this patent is extended or adjusted under 35 U.S.C. 154(b) by 1094 days.

(21) Appl. No.: 11/241,420

(22) Filed: Sep. 30, 2005

(65) Prior Publication Data

US 2008/0003106 A1 Jan. 3, 2008

(51) Int. Cl.
*B64C 27/33* (2006.01)
*B64C 27/35* (2006.01)
*B64C 27/39* (2006.01)

(52) U.S. Cl. .................. 416/1; 416/134 A; 416/135; 416/138; 416/141; 384/221; 384/455; 384/620

(58) Field of Classification Search .............. 416/1, 416/134 A, 135, 138, 141; 384/221, 455, 384/620
See application file for complete search history.

(56) References Cited

U.S. PATENT DOCUMENTS

| | | | |
|---|---|---|---|
| 4,477,225 A | 10/1984 | Burkam | |
| 4,542,567 A | 9/1985 | McArdle et al. | |
| 4,817,453 A | 4/1989 | Breslich et al. | |
| 4,886,419 A | 12/1989 | McCafferty | |
| 4,898,515 A * | 2/1990 | Beno et al. | 416/134 A |
| 4,991,462 A | 2/1991 | Breslich et al. | |
| 6,050,778 A | 4/2000 | McArdle et al. | |
| 6,155,784 A * | 12/2000 | Carter, Jr. | 416/134 A |
| 6,200,097 B1 | 3/2001 | Mouille | |
| 6,824,096 B2 | 11/2004 | Zoppitelli et al. | |
| 6,830,214 B2 | 12/2004 | Carson | |
| 6,860,015 B2 | 3/2005 | Muylaert | |
| 6,889,965 B2 | 5/2005 | Loftus et al. | |

FOREIGN PATENT DOCUMENTS

| | | |
|---|---|---|
| GB | 2 001 025 | 1/1979 |
| GB | 2 036 677 | 7/1980 |
| GB | 0 069 455 | 1/1983 |

* cited by examiner

*Primary Examiner*—Christopher Verdier (57) ABSTRACT

Rotor apparatus and methods for vertical lift aircraft are disclosed. In one embodiment, a bearing assembly adapted for rotatably coupling a rotor blade to a support member includes an inner housing annularly disposed about a portion of the support member, an outer housing annularly disposed about at least part of the inner housing and is rotatably coupled to the inner housing by an annular bearing device, and a flexible member adapted to be coupled to the support member and including an engagement portion adapted to engage the outer housing and to at least partially relax a side force exerted on the annular bearing device by a bending of at least one of the rotor blade and the support member.

31 Claims, 12 Drawing Sheets

FIG.16

ROTOR APPARATUS AND METHODS FOR VERTICAL LIFT AIRCRAFT

GOVERNMENT LICENSE RIGHTS

This invention was made with Government support under contract number MDA972-98-9-0004 awarded by the Defense Advanced Research Projects Agency. The Government has certain rights in this invention.

FIELD OF THE INVENTION

This invention relates to rotor apparatus and methods, and more specifically, to rotor apparatus and methods for use on helicopters, manned and unmanned aerial vehicles, rotor/wing aircraft, and other vertical lift aircraft.

BACKGROUND OF THE INVENTION

Various types of aircraft are capable of vertical flight, including helicopters, manned and unmanned aerial vehicles, and rotor/wing aircraft. Such aircraft typically include a rotor blade assembly that rotates to provide lift. The rotor blade assembly usually includes two (or more) rotor blades attached to a central hub assembly which, in turn, is attached to an engine. The engine drives the hub assembly and rotor blades, and the rotor blades provide the aerodynamic lift necessary for flight. Examples of vertical flight aircraft having known rotor blade assemblies include those aircraft and assemblies disclosed, for example, in U.S. Pat. No. 6,889,965 B2 issued to Loftus and Muylaert, U.S. Pat. No. 6,830,214 B2 issued to Carson, U.S. Pat. No. 6,824,096 B2 issued to Zoppitelli et al., U.S. Pat. No. 6,200,097 B1 issued to Mouille, and U.S. Pat. No. 6,024,325 issued to Carter. Although desirable results have been achieved using such prior art aircraft, there may be room for improvement. For example, it would advantageous to provide novel apparatus and methods that may reduce the weight of vertical flight aircraft, as well as reduce manufacturing costs and operating expenses.

SUMMARY OF THE INVENTION

The present invention is directed to rotor apparatus and methods for vertical lift aircraft. Embodiments of systems and methods in accordance with the present invention may advantageously reduce the weight of vertical flight aircraft, and may also reduce manufacturing costs and operating expenses, in comparison with prior art aircraft having conventional rotor blade assemblies.

In one embodiment, a bearing assembly adapted for rotatably coupling a rotor blade to a support member includes an inner housing, an outer housing, and a flexible member. The inner housing is annularly disposed about a portion of the support member and is adapted to be coupled to the rotor blade. The outer housing is annularly disposed about at least part of the inner housing and is rotatably coupled to the inner housing by an annular bearing device. The flexible member adapted to be coupled to the support member and includes an engagement portion adapted to extend outwardly from the support member and to engage with the outer housing, the engagement portion being adapted to at least partially relax a side force exerted on the annular bearing device by a bending of at least one of the rotor blade and the support member.

In a further embodiment, a hub assembly for a vertical lift rotary aircraft includes a plurality of elongated, approximately radially-disposed support members, each support member including a support arm having a hollowed out cavity therethrough, and an elongated, approximately radially-extending tension member extending through the cavity. The hub assembly further includes a plurality of rotor blades, each rotor blade being operatively coupled to a corresponding one of the support members by a blade coupling assembly, wherein at least one of the blade coupling assemblies includes a first bearing assembly coupled between the tension member and the rotor blade at a radially-outward location from an outboard end of the support arm, the first bearing assembly including a thrust bearing device, and a second bearing assembly coupled between the support arm and the rotor blade proximate the outboard end of the support arm, the second bearing assembly including an annular bearing device.

In another embodiment, a blade assembly includes an elongated support member, a rotor blade operatively coupled to the support member, the rotor blade including an inboard end portion; and a lag damper assembly. The lag damper assembly includes a housing portion having at least one first engagement surface, and a slide member portion having at least one second engagement surface, at least one of the housing portion and the slide member portion being coupled to the support member proximate the inboard end portion of the rotor blade, the other of the housing portion and the slide member portion being adapted to be coupled to an adjacent structure, and wherein the first and second engagement surfaces are adapted to frictionally interact to at least partially dampen a movement of the support member relative to the adjacent structure. In one embodiment, the at least one first engagement surface of the housing portion comprises a pair of spaced apart friction pads, the slide member portion being slideably disposed between the friction pads and including a pair of second engagement surfaces, each second engagement surface being disposed on a lateral side surface of the slide member portion.

BRIEF DESCRIPTION OF THE DRAWINGS

Embodiments of the present invention are described in detail below with reference to the following drawings.

DETAILED DESCRIPTION

The present invention relates to rotor apparatus and methods for vertical lift aircraft. Many specific details of certain embodiments of the invention are set forth in the following description and in FIGS. 1-16 to provide a thorough understanding of such embodiments. The present invention may have additional embodiments, or may be practiced without one or more of the details described below.

Figure 1:
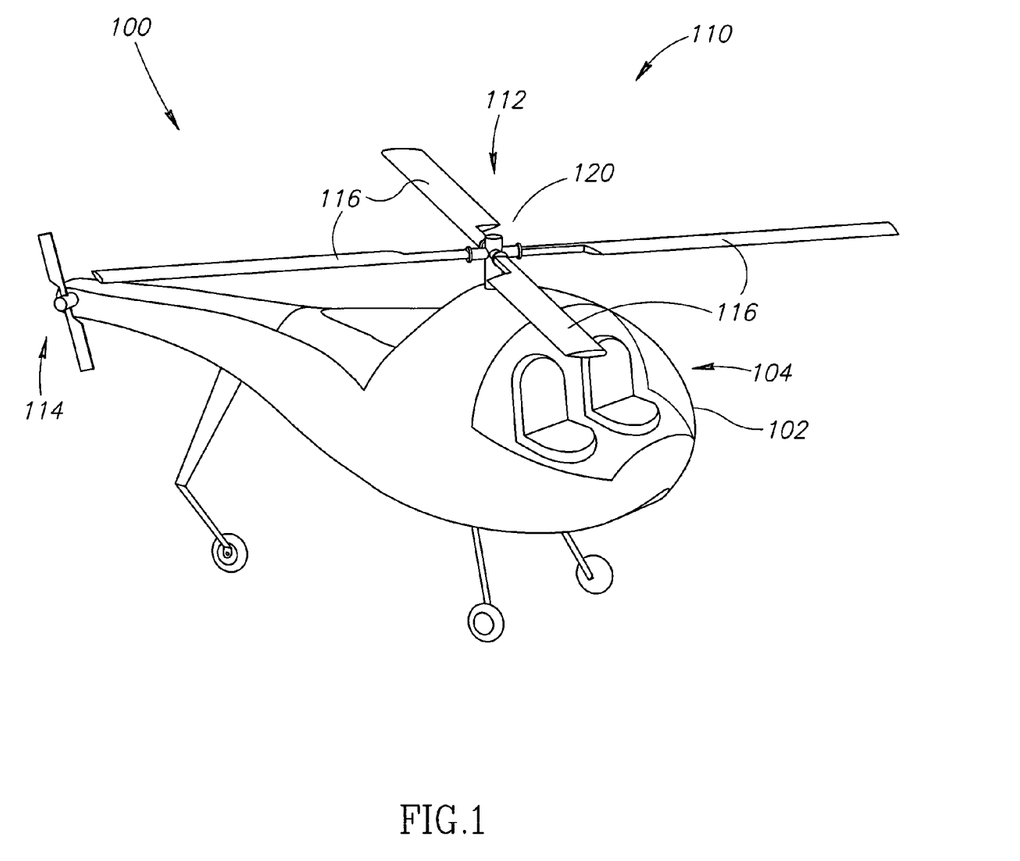
FIG. 1 is an isometric view of a vertical lift aircraft having a rotor blade assembly in accordance with an embodiment of the invention.

FIG. 1 is an isometric view of a vertical lift aircraft 100 in accordance with an embodiment of the invention. In this embodiment, the aircraft 100 includes a rotary lift and propulsion system 110 having a main rotor assembly 112 disposed at an upper portion of a fuselage 102, and a tail rotor assembly 114 disposed at an aft portion of the fuselage 102. The main rotor assembly 112 is a semi-rigid rotor assembly and includes four rotor blades 116, each rotor blade 116 being coupled to a centrally-disposed hub assembly 120 in accordance with an embodiment of the invention. An engine (not visible) is disposed within the fuselage 102 and is coupled to the hub assembly 120 to provide the motive force for rotating the main rotor assembly 112 to generate lift during flight. The aircraft 100 may include a cockpit 104 disposed in a forward portion of the fuselage 110 for manned operations, or alternately, the cockpit 104 may be eliminated, such as for an unmanned aerial vehicle (UAV).

Figure 2:
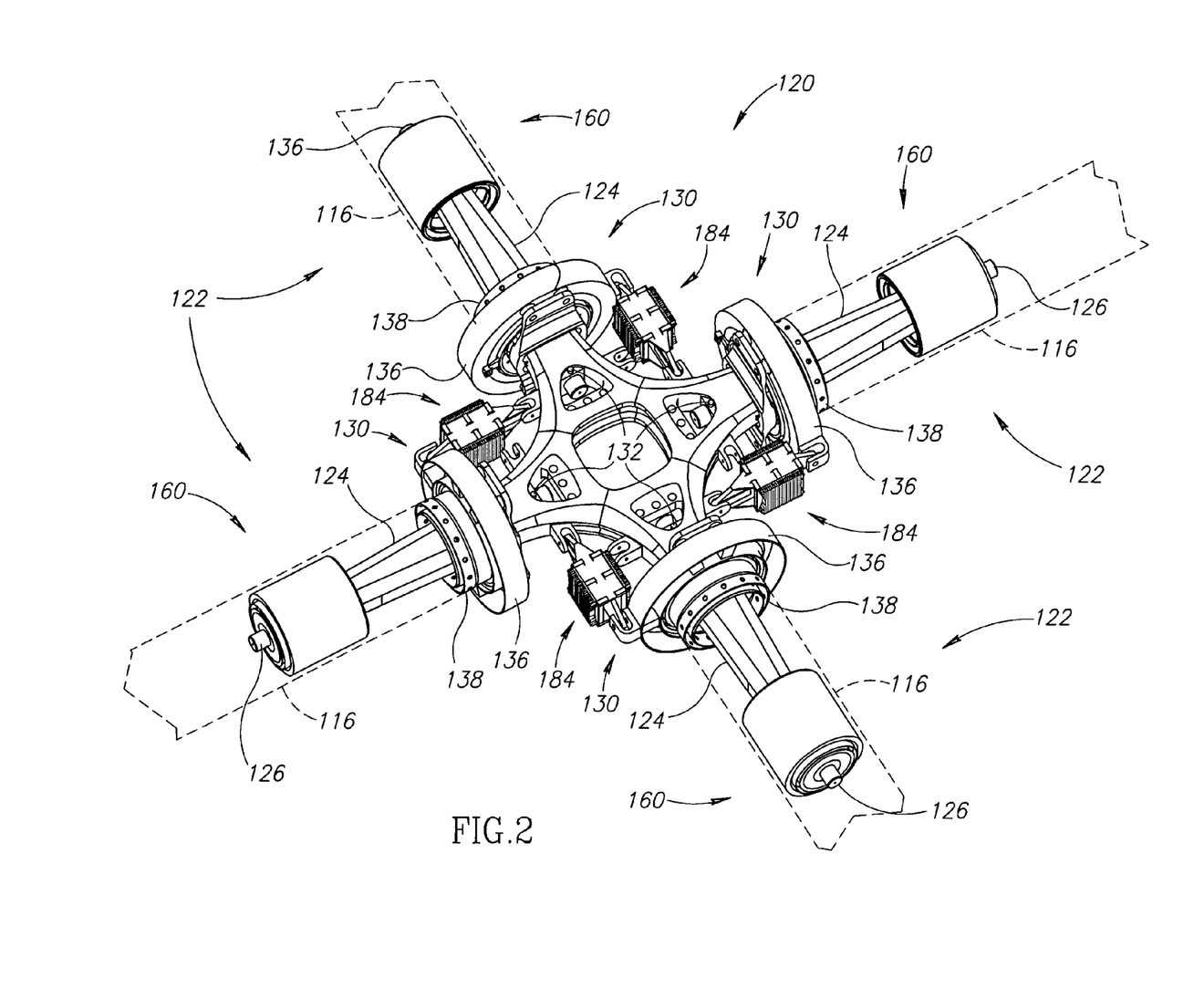
FIG. 2 is an enlarged, isometric view of a hub assembly of the vertical lift aircraft of FIG. 1 in accordance with another embodiment of the invention.

FIG. 2 is an enlarged, isometric view of the hub assembly 120 of the aircraft 100 of FIG. 1. In this embodiment, the hub assembly 120 includes four blade coupling assemblies 122. Each blade coupling assembly 122 is coupled to one of the rotor blades 116 (partially shown in phantom lines) of the main rotor assembly 112. As described more fully below, each blade coupling assembly 122 securely couples a corresponding rotor blade 116 to the hub assembly 120, and may perform various other functions that allow the rotor blade 116 to operate properly for generating aerodynamic lift.

Figure 3:
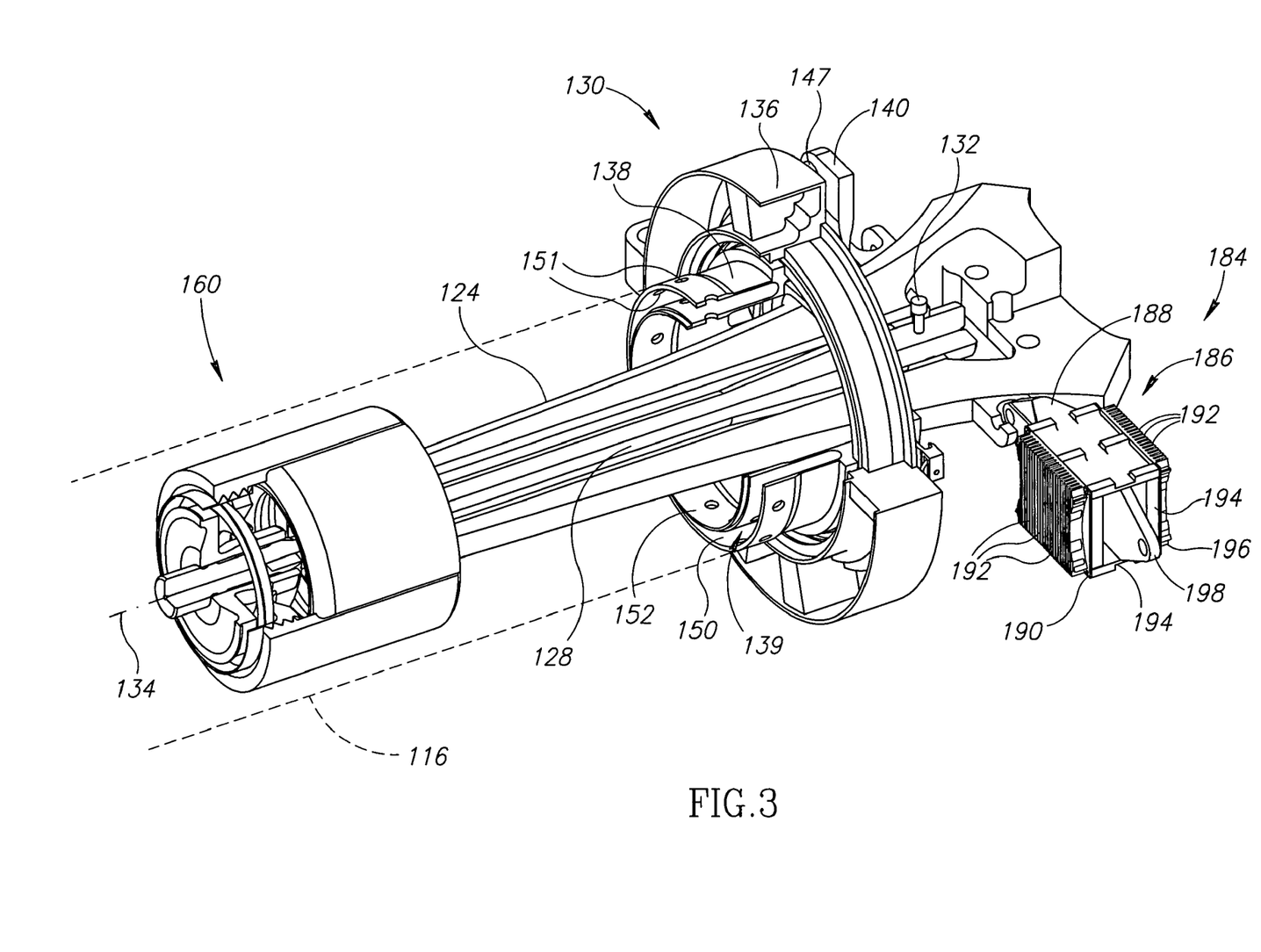
FIG. 3 is an enlarged isometric, partial cutaway view of a blade coupling assembly of the hub assembly of FIG. 2.
Figure 4:
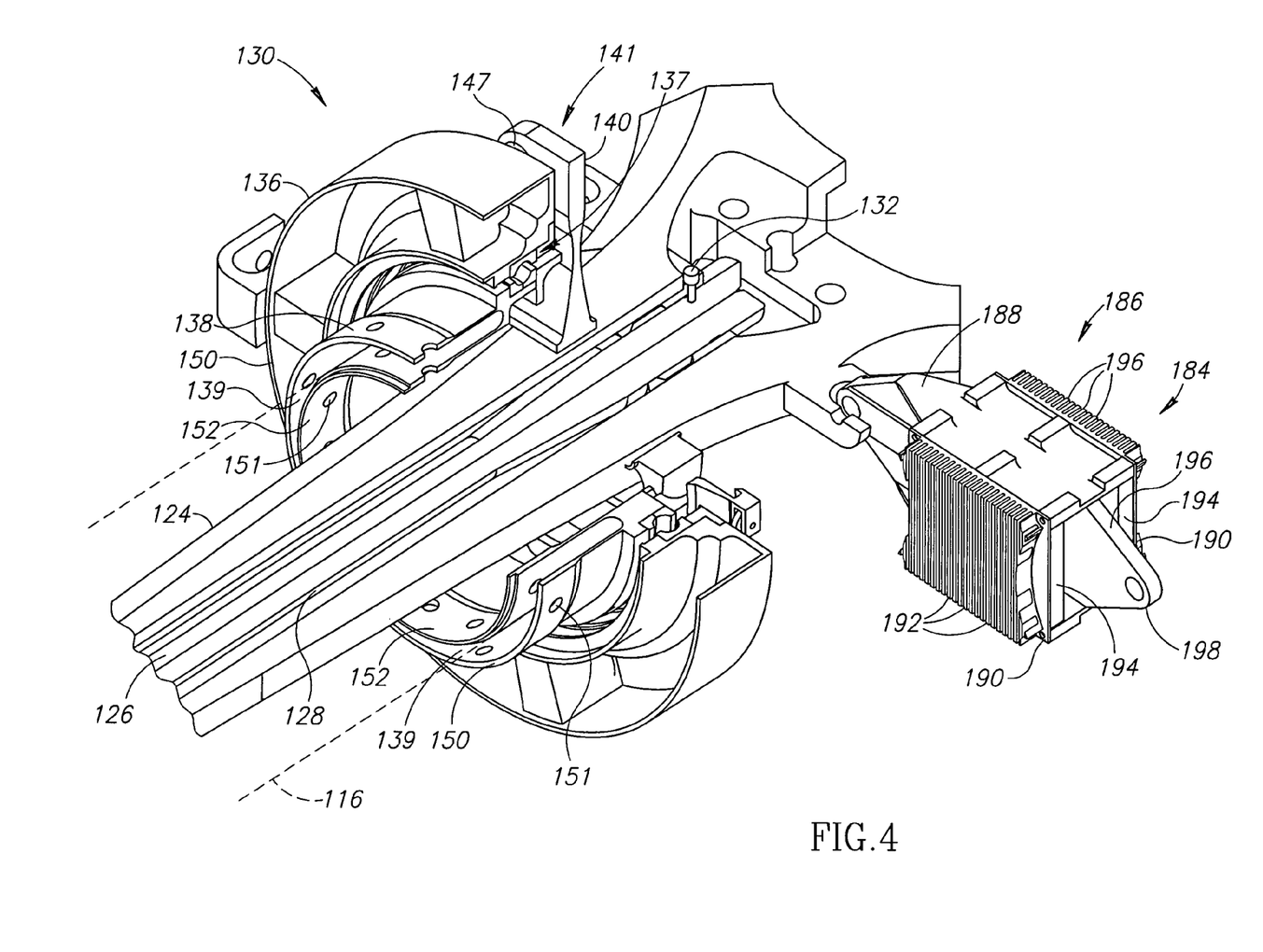
FIG. 4 is an enlarged, partial isometric view of the blade coupling assembly of FIG. 3.
Figure 5:
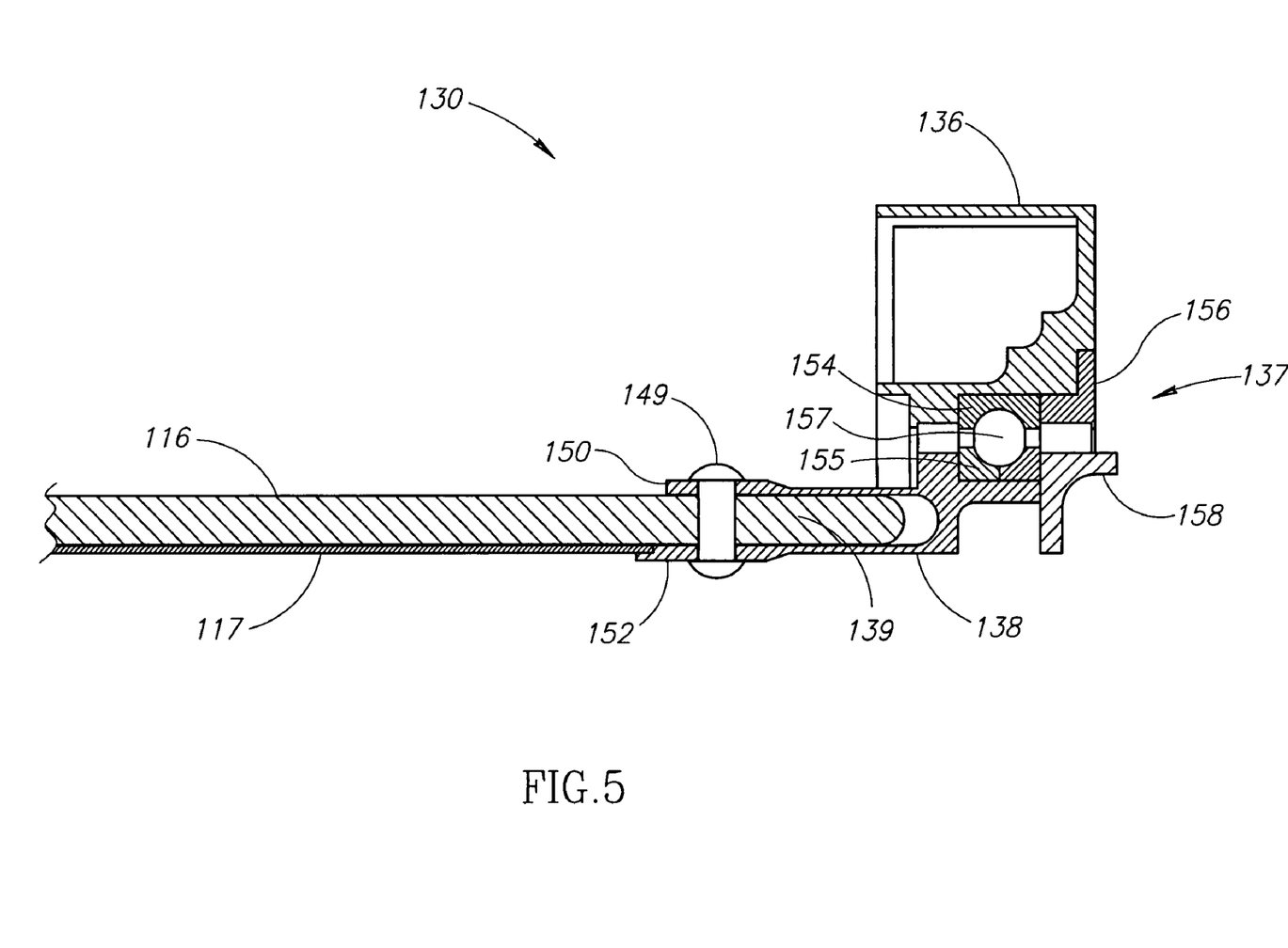
FIG. 5 is an enlarged cross-sectional view of an inner bearing assembly of the blade coupling assembly of FIG. 3.

FIG. 3 is an enlarged isometric, partial-cutaway view of one of the blade coupling assemblies 122 of FIG. 2. At least one of the blade coupling assemblies 122 includes a support member 124 such as an elongated flex beam 124, a flexible member 140 coupled to the flex beam 124, and an annular bearing device disposed about the flex beam 124. FIGS. 4 and 5 are enlarged, partial isometric and cross-sectional views of the blade coupling assembly 122 of FIG. 3. In this embodiment, the blade coupling assembly 122 includes an elongated flex beam 124 that extends from a central portion of the hub assembly 120 outwardly to an outer portion of the blade coupling assembly 122. The flex beam 124 is a non-rigid member that functions as a relatively stiff "spring" member. A tension member 126 extends along a longitudinal axis within a central, hollowed out portion 128 of at least one flex beam 124. An inner bearing assembly 130 is annularly disposed about the flex beam 124 near an inboard end of the rotor blade 116 (FIG. 2). Similarly, an outer bearing assembly 160 is annularly disposed about the flex beam 124 near an outboard end of the blade coupling assembly 122.

In one particular embodiment, the tension member 126 may be coupled to the inner and outer bearing assemblies 130, 160, and the inner and outer bearing assemblies 130, 160 may be coupled to the rotor blade 116. The rotor blade 116, the inner and outer bearing assemblies 130, 160, and the tension member 126 may detach from the flex beam 124 as a unit with the rotor blade 116. Further, the unit including the rotor blade 116, the inner and outer bearing assemblies 130, 160, and the tension member 126 may be removably coupled to the flex beam 124 by inserting the tension member 126 into the hollowed out portion 128 of the flex beam 124 until the inner and outer bearing assemblies 130, 160 are engaged with the flex beam 124 at their respective positions proximate the inboard and outboard portions of the blade coupling assembly 122, and then applying a fastening device 132 (e.g. a threaded fastener and locking pin) to the inboard end of the tension member 126, securing the tension member 126 (and thus the rotor blade 116 and inner and outer bearing assemblies 130, 160) to the flex beam 124. During operation of the vertical lift aircraft 100, axial forces exerted on the rotor blade 116 (along a longitudinal axis 134) are primarily carried by the tension member 126 to the flex beam 124, while other non-axial forces and torsional loads are carried by the inner and outer bearing assemblies 130, 160 (and the tension member 126) to the flex beam 124.

As further shown in FIGS. 3-5, the inner bearing assembly 130 includes a first housing 136 and a second housing 138. The first and second housings 136, 138 are annularly and concentrically disposed about the flex beam 124, and are coupled together by an annularly-shaped roller bearing 137 (FIGS. 4 and 5) that allows relative rotation about the longitudinal axis 134 (FIG. 3) between the first and second housings 136, 138. In alternate embodiments, any type of bearing may be substituted for the roller bearing 137, including a needle bearing, a ball bearing, or any other suitable rolling element bearing. The second housing 138 includes an outer longitudinally-extending portion 150 and an inner longitudinally-extending portion 152, and an annular receiving area 139 disposed therebetween that is adapted to receive a corresponding end portion of the rotor blade 116, enabling the second housing 138 to be coupled to the rotor blade 116. As shown in FIG. 5, the inner longitudinally-extending portion 152 may abut with an inner metallic sleeve 117 (e.g. a titanium sleeve) of the rotor blade 116 when the blade 116 is installed in the receiving area 139. In one particular embodiment, the end portion of the rotor blade 116 is secured within the receiving area 139 using a suitable adhesive. In a further embodiment, a plurality of fasteners 149 (FIG. 5) may be disposed through apertures 151 in the outer and inner longitudinally-extending portions 150, 152 and the end portion of the rotor blade 116 to attach the rotor blade to the second housing 138.

As further shown in FIG. 5, the annularly-shaped roller bearing 137 includes an outer race 154 proximate the outer housing 136, and a two-piece inner race 155 proximate the second housing 138. In one embodiment, the annularly-shaped roller bearing 137 is assembled by securing the outer race 154 in position using an outer retaining member 156. A first portion of the inner race 155 is positioned proximate the inner housing 138, and a plurality of ball bearings 157 are disposed between the outer and inner races 154, 155. A second portion of the inner race 155 is then positioned to secure the plurality of ball bearings 157 in position, and an inner retaining member 158 is attached to the inner housing 138 to secure the inner race 155 in position.

Figure 6:
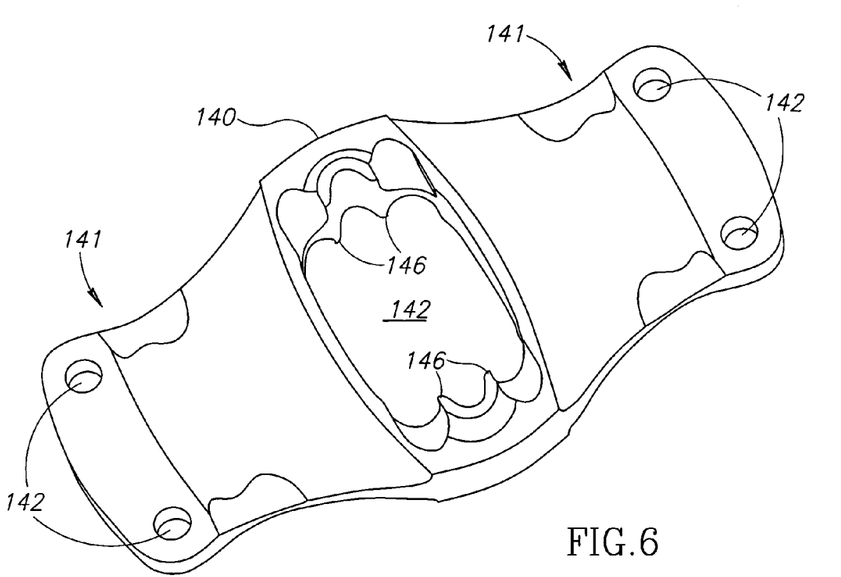
FIG. 6 is an isometric view of a flex plate of the inner bearing assembly of FIG. 3.

As best shown in FIG. 4, a flexible member 140 such as a flex plate 140 is coupled to the flex beam 124. The flex plate 140 may have an aperture disposed therethrough and adapted to receive an elongated flex beam 124, and at least two outwardly extending engagement portions. FIG. 6 is an isometric view of the flex plate 140 of the inner bearing assembly 130 of FIG. 3. In this embodiment, the flex plate 140 has a pair of outwardly-extending members 141 that extend radially-outwardly to a position proximate the first housing 136. Each of the outwardly-extending members 141 includes a thickened engagement portion 147 having a pair of fastener holes 142 disposed therein for coupling the outwardly-extending member 141 to the first housing 136 using fasteners (e.g. bolts). The flex plate 140 is preferably tuned or designed to place resonant frequencies outside the operating conditions of the rotor assembly. A main aperture 144 is formed through the flex plate 140 and is adapted to receive the flex beam 124. In one particular embodiment, the flex plate 140 is attached to the flex beam 124 by welding at a plurality of attachment locations 146 along a portion of a perimeter of the main aperture 144.

Figure 7:
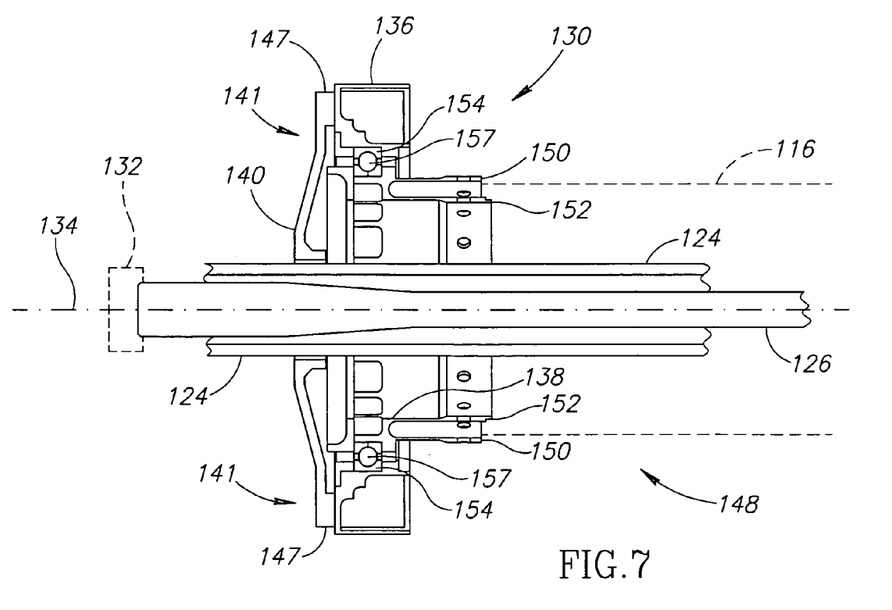
FIG. 7 is a side cross-sectional view of the inner bearing assembly of FIG. 3 in a nominal, unflexed position.
Figure 8:
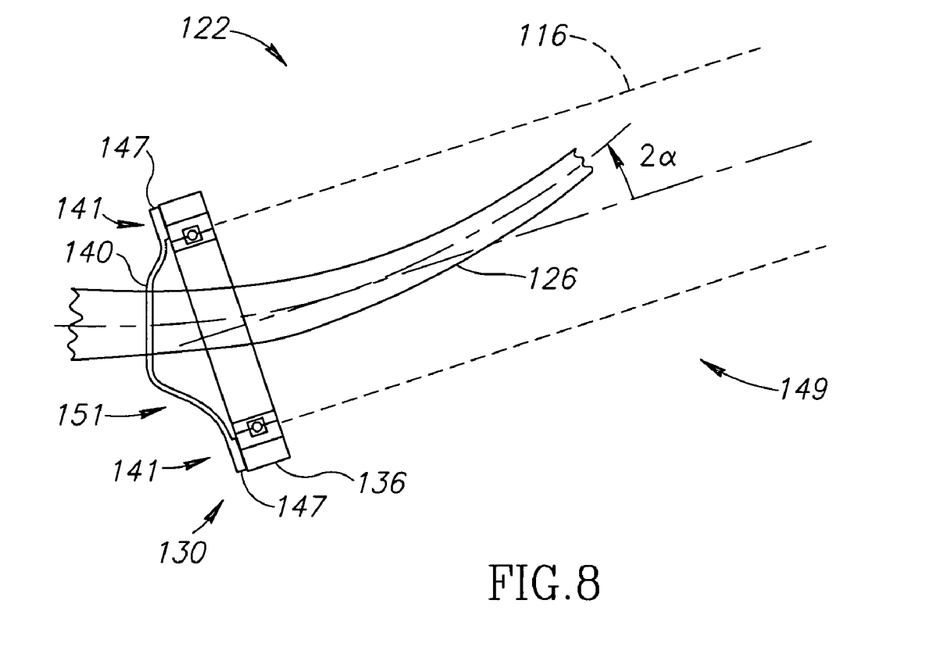
FIG. 8 is a side cross-sectional view of the inner bearing assembly of FIG. 3 in a flexed position.

FIG. 7 is a side cross-sectional view of the inner bearing assembly 130 of FIG. 3 in a nominal, unflexed position 148. FIG. 8 is a side cross-sectional view of the inner bearing assembly 130 of FIG. 3 in a flexed position 149. As shown in FIG. 8, during operation of the hub assembly 120, the rotor blade 116 may be flexed into the flexed position 149 by the aerodynamic forces acting on the rotor blade 116. In some embodiments, if the first housing 136 is rotated by a first angle α from its nominal (or vertical) orientation in the unflexed position 148 (FIG. 7), an outboard end of the tension member 126 may be flexed by a bending angle approximately equal to twice the first angle (i.e. 2α). In some embodiments, the first angle α is typically approximately 1 to 2 degrees.

Figure 9:
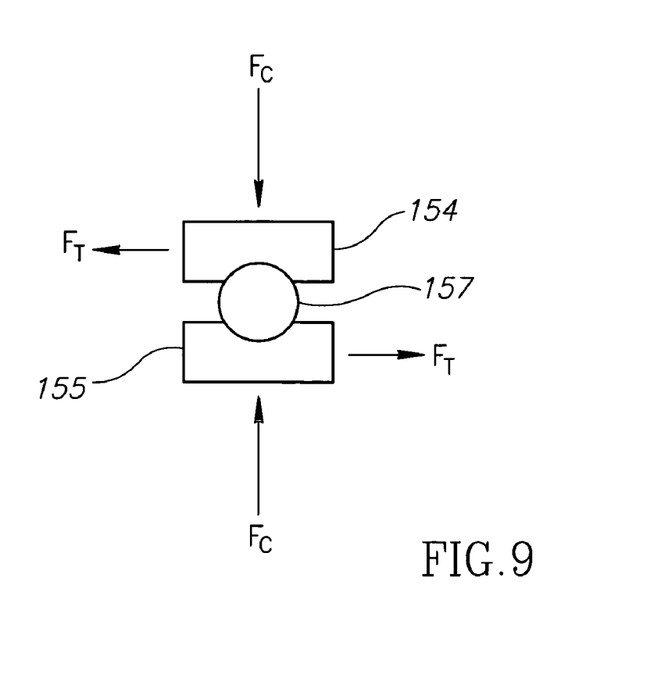
FIG. 9 is an enlarged schematic view of the forces acting on an annularly-shaped roller bearing of the inner bearing assembly in the flexed position shown in FIG. 8.

FIG. 9 is an enlarged schematic view of the forces acting on the annularly-shaped roller bearing 137 of the inner bearing assembly 130 in the flexed position 149 (FIG. 8). As the rotor blade 116 is rotated into the flexed position 149, compressive forces $F_c$ acting on the bearing 137 remain substantial, while side forces $F_T$ increase with increased bending. To delay or avoid damaging or failure of the bearing 137 due to the phenomenon known as Brinneling caused by the side forces $F_T$ as the rotor blade 116 flexes, the first housing 136 engages against the engagement portions 147 of one of the outwardly-extending members 141 of the flex plate 140, bending the flex plate 140 into a distorted position 151. Thus, the flex plate 140 relaxes the side forces $F_T$ experienced by the annularly-shaped roller bearing 137 of the inner bearing assembly 130 during flexure of the rotor blade 116, thereby reducing or eliminating the loads that might otherwise damage the bearing 137. As the loads on the rotor blade 116 are reduced, the tension member 126 and flex plate 140 return to their nominal, non-distorted shape. It may be appreciated that the flex plate 140 may provide the desired functionality of relaxing the side forces experienced by the annularly-shaped roller bearing 137 at substantially reduced cost (e.g. one to two orders of magnitude lower in cost) in comparison with prior art alternative bushing devices.

Figure 10:
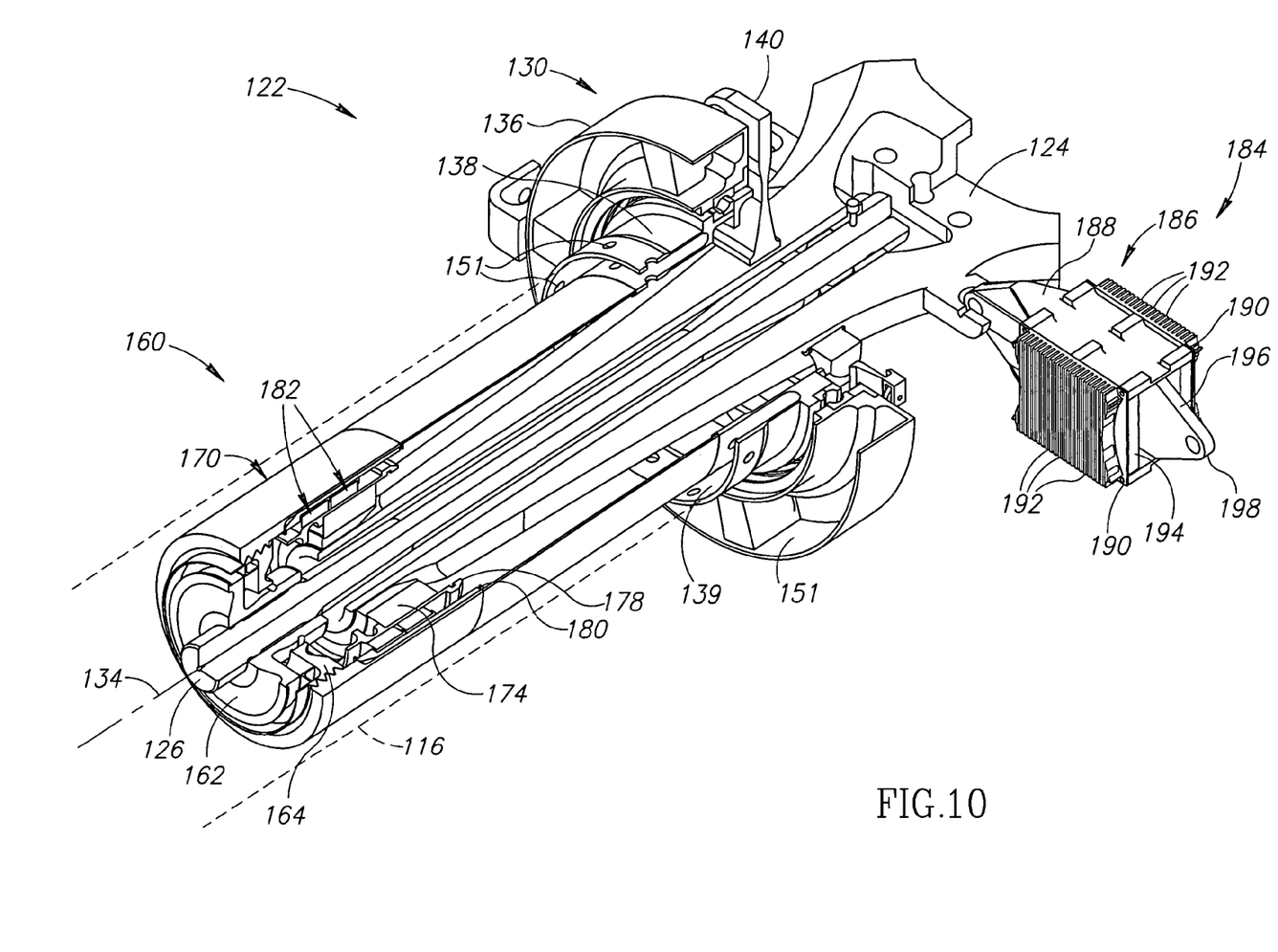
FIG. 10 is another enlarged isometric, partial cutaway view of the blade coupling assembly of FIG. 2.
Figure 11:
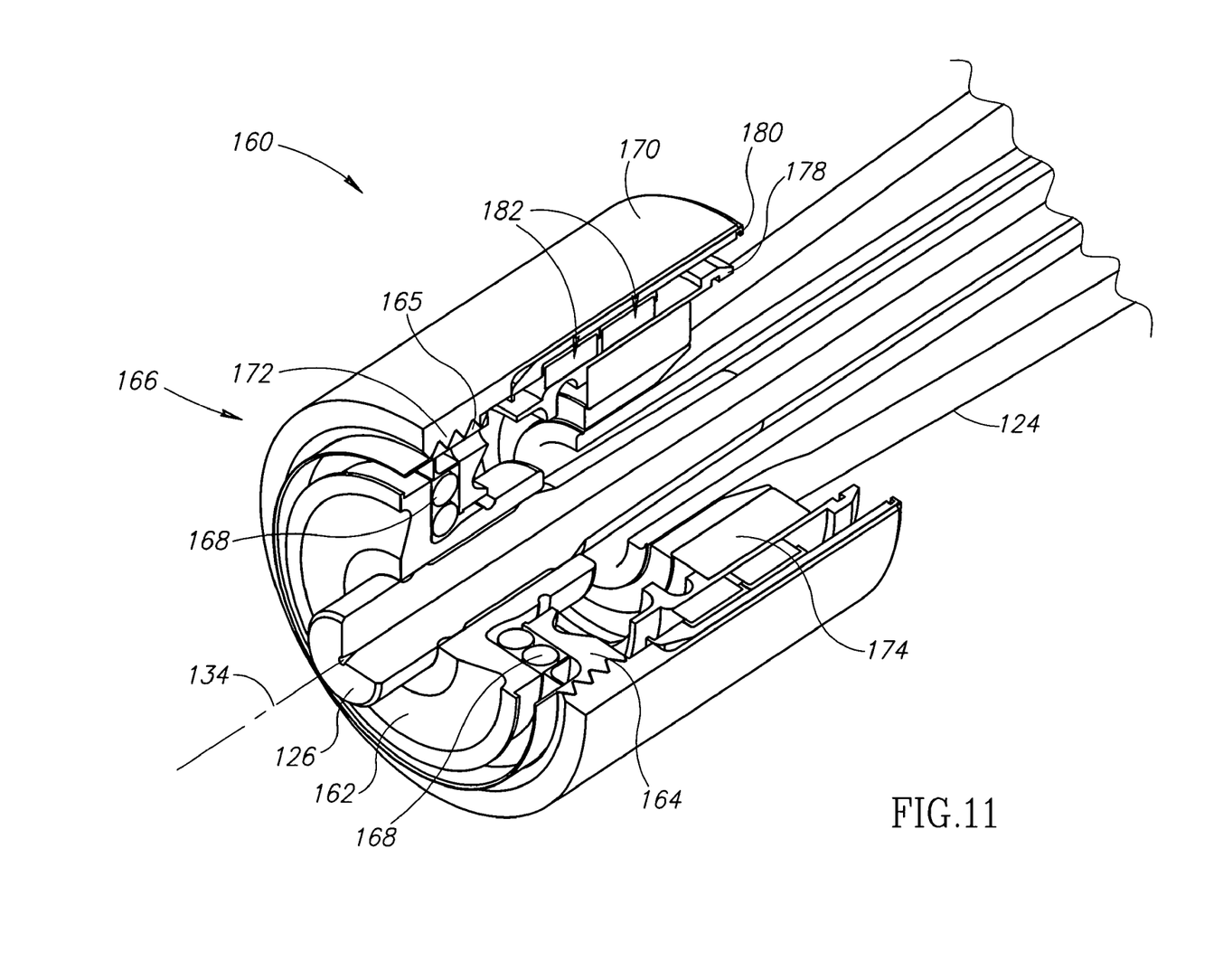
FIG. 11 is an enlarged, isometric view of an outer bearing assembly of the blade coupling assembly of FIG. 3 in accordance with another embodiment of the invention.
Figure 12:
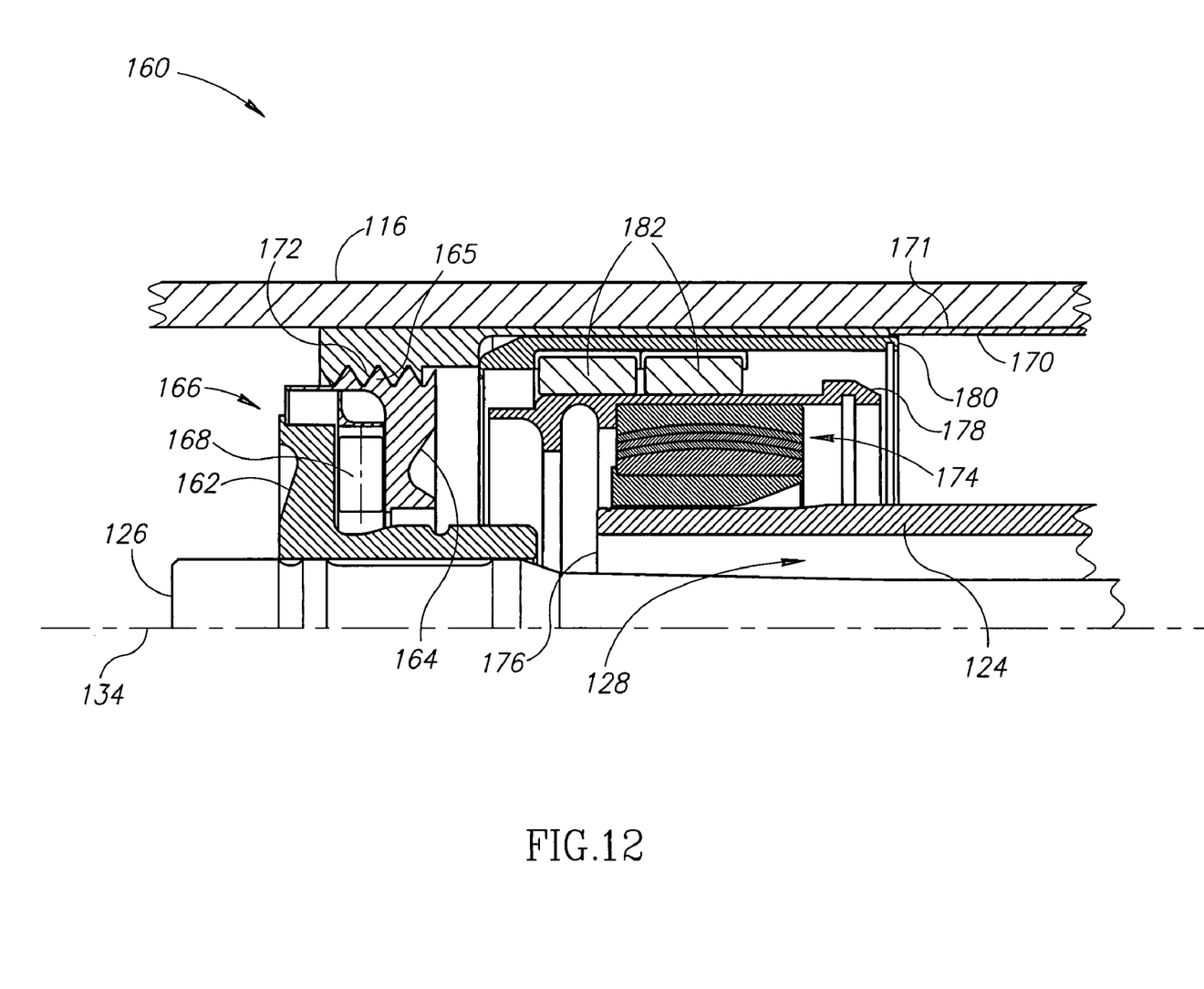
FIG. 12 is a side cross-sectional view of the outer bearing assembly of FIG. 11.

FIG. 10 is an isometric, partial cutaway view of the blade coupling assembly 122 of FIG. 2, showing additional structural aspects of the outer bearing assembly 160. FIGS. 11 and 12 are enlarged isometric and side cross-sectional views of the outer bearing assembly 160 of FIG. 10. In this embodiment, the outer bearing assembly 160 includes a first race 162 annularly disposed about the tension member 126 near the outboard end of the blade coupling assembly 122. A second race 164 is also annularly disposed about the tension member 126 and is spaced apart from the first race 162 in an inboard direction along the longitudinal axis 134. A thrust roller bearing 166 (including a plurality of rollers 168) is disposed between the first and second races 162, 164, allowing relative rotational motion between the first and second races 162, 164 about the longitudinal axis 134. An annular cuff 170 is coupled to an inner surface 171 of the rotor blade 116, and includes a first threaded portion 172 that threadedly engages a second threaded portion 165 of the second race 164. It will be appreciated that the thrust roller bearing 166 transmits axial loads (i.e. along the longitudinal axis 134) from the rotor blade 116 to the tension member 126, while allowing the rotor blade 116 to rotate around the longitudinal axis 134 with respect to the tension member 126 by means of the relative rotational motion between the first and second races 162, 164.

Figure 13:
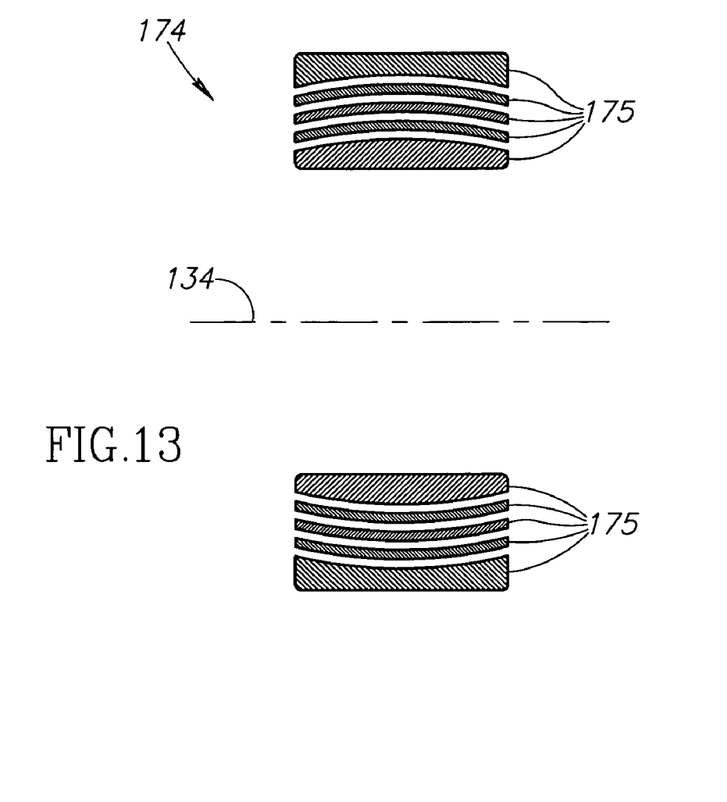
FIG. 13 is an isometric view of a bushing of the outer bearing assembly of FIG. 11.
Figure 14:
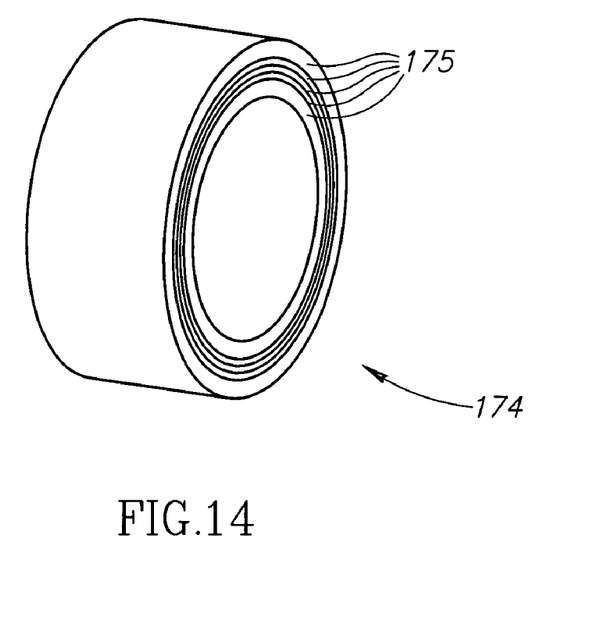
FIG. 14 is a side cross-sectional exploded view of the bushing of FIG. 13.

As further shown in FIG. 12, a bushing 174 is annularly engaged on a bushing seat 176 coupled to the flex beam 124. FIGS. 13 and 14 are enlarged, isometric and cross-sectional views, respectively, of the bushing 174 of FIG. 12. The bushing 174 includes a plurality of annularly disposed layers 175. The layers 175 may be formed of any suitable, resilient materials, including polymeric and elastomeric (e.g. rubber) materials. In one particular embodiment, the bushing 174 is of a type commercially-available from Lord Corporation of Cary, N.C.

With continued reference to FIG. 12, the outer bearing assembly 160 further includes a third race 178 cylindrically-disposed about the bushing 174. A fourth race 180 is radially spaced apart from and cylindrically-disposed about the third race 178, and engaged against the cuff 170. A pair of needle bearing assemblies 182 are disposed between the third and fourth races 178, 180, allowing relative rotational motion between the third and fourth races 178, 180. The bushing 174 absorbs and dampens vibrations and transmits loads from the rotor blade 116 to the flex beam 124.

Figure 15:
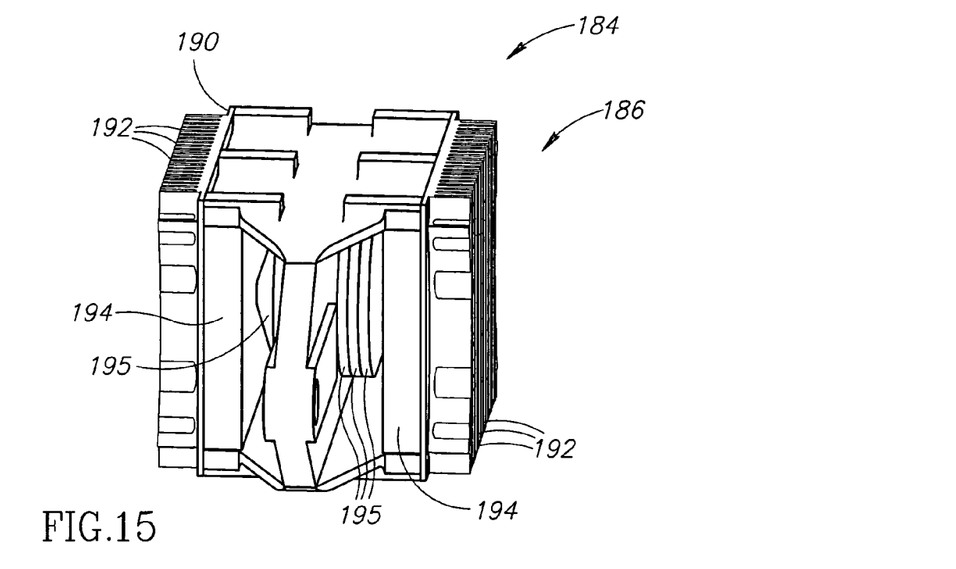
FIG. 15 is an enlarged, end isometric view of the lag damper assembly of FIG. 3.
Figure 16:
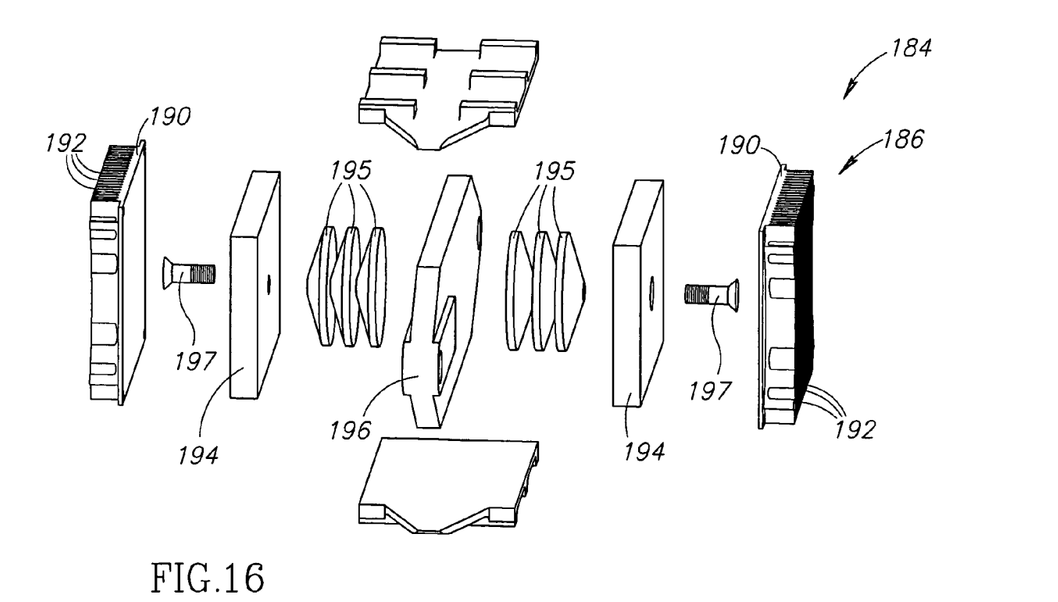
FIG. 16 is an isometric, exploded view of the lag damper assembly of FIG. 15.

Referring again to FIG. 2, each of the blade coupling assemblies 122 of the hub assembly 120 also includes a lag damper assembly 184. FIG. 15 is an enlarged end isometric view of the lag damper assembly 184 of FIG. 2, and FIG. 16 is an exploded isometric view of the lag damper assembly 184 of FIG. 15. In this embodiment, the lag damper assembly 184 includes a housing 186 having an end portion 188 coupled to the flex beam 124. The housing 186 also includes a pair of sidewalls 190, each sidewall 190 having a plurality of outwardly-projecting cooling fins 192. A friction pad 194 is disposed proximate each of the sidewalls 190, and the friction pads 194 are coupled to a slide member 196. As shown in FIG. 16, a plurality of spring (or conical) washers 195, also referred to as Belleville washers, are disposed between the friction pads 194 and the slide member 196. The friction pads 194 are moveably coupled to the slide member 196 by a fastener 197, and the spring washers 195 serve to bias the friction pads 194 outwardly from the slide member 196 against the sidewalls 190. Of course, in alternate embodiments, any type of springs or biasing members may be used, including coil springs, leaf springs, resilient layers, or any other suitable spring members. An end portion 198 of the slide member 196 projects outwardly from the housing 186 and is coupled to the first housing 136 of the adjacent blade coupling assembly 122.

In operation, loads acting on the rotor blade 116 during rotational of the hub assembly 120 may cause the rotor blade 116 to "lag" or bend backwardly. The lagging motion of the rotor blade 116 is at least partially dampened by the lag damper assembly 184. More specifically, as a first one of the rotor blades 116a begins to lag, the housing 186 of the lag damper assembly 184 remains coupled to the flex beam 124a associated with the first rotor blade 116a, and is drawn in the direction of the lag along with the flex beam 124a. The slide member 196, however, is coupled to the first housing 136b of an adjacent blade coupling assembly 122b (coupled to a second one of the rotor blades 116b). The lag of the first rotor blade 116 therefore causes relative movement between the friction pads 194 (which are attached to the slide member 196) and the sidewalls 190 of the housing 186. The frictional engagement between the friction pads 194 (which are pushed outwardly by the spring washers 195) and the sidewalls 190 at least partially inhibits the lag motion of the first rotor blade 116a (and the first blade coupling assembly 122a) as the first rotor blade 116 bends backwardly. The frictional engagement between the frictions pads 194 and the sidewalls 190 may also at least partially inhibit the motion of the first rotor blade 116a (and the first blade coupling assembly 122a) as it springs forwardly, driving the slide member 196 (and the friction pads 194) into the housing 186. Thus, the lag damper assemblies 184 dampen the lagging motion of each of the rotor blades 116 of the hub assembly 120. In one particular embodiment, the range of motion of the slide member 196 with respect to the housing 186 is approximately 0.125 to 0.25 inches, and the spring washers 195 provide between approximately 500 to 1000 lbs. of friction force, resulting in approximately 5 horsepower of extracted power during operation.

It will be appreciated that a variety of alternate embodiments of lag damper assemblies may be conceived, and that the invention is not limited to the particular embodiments described above and shown in the accompanying figures. For example, in an alternate embodiment, the orientation of the lag damper assembly 184 is reversed (i.e. rotated 180 degrees) from the orientation shown in FIG. 2 so that the slide member 196 is coupled to the flex beam 124 and the housing 186 is coupled to the outer housing 136b of the adjacent blade coupling assembly 122b. In further embodiments, only a single friction pad 194 may be employed. Alternately, the configuration of the friction pads 194 and the slide member 196 might be reversed such that a single, stationary friction pad might be located in the housing, and the slide member has a pair of engagement surfaces that clampably or otherwise resiliently engage on opposing sides of the friction pad. In still another embodiment, the friction pads 94 may be coupled to the housing 186 and may be biased inwardly against the slide member 196.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A bearing assembly adapted for rotatably coupling a rotor blade to a support member, comprising:
    an inner housing annularly disposed about a portion of the support member and adapted to be coupled to the rotor blade;
    an outer housing annularly disposed about at least part of the inner housing and rotatably coupled to the inner housing by an annular bearing device; and
    a flexible member adapted to be coupled to the support member and including an engagement portion adapted to extend outwardly from the support member and to engage with the outer housing, the engagement portion being adapted to at least partially relax a side force exerted on the annular bearing device by a bending of at least one of the rotor blade and the support member.

2. The bearing assembly of claim 1, wherein the support member comprises an elongated support member having an inboard end and an outboard end, and wherein the outer housing includes an inboard side surface, the engagement portion of the flexible member being adapted to engage the inboard side surface of the outer housing.

3. The bearing assembly of claim 1, wherein the annular bearing device comprises a rolling element bearing device.

4. The bearing assembly of claim 1, wherein the flexible member comprises a plate member having an aperture disposed therethrough and adapted to receive the support member, and at least two outwardly extending engagement portions.

5. The bearing assembly of claim 1, wherein the inner housing includes a receiving area adapted to receive corresponding end portion of the rotor blade.

6. A hub assembly for a vertical lift rotary aircraft, comprising:
    a plurality of elongated, approximately radially-disposed support members;
    a plurality of rotor blades, each rotor blade having an inboard end portion and being operatively coupled to a corresponding one of the support members by a blade coupling assembly, wherein at least one of the blade coupling assemblies includes:
        an annular bearing device disposed about its corresponding support member; and
        a flexible member coupled to the support member and including an engagement portion extending outwardly from the support member proximate to the inboard end portion of the rotor blade, the engagement portion being adapted to at least partially relax a side force exerted on the annular bearing device by a bending of at least one of the rotor blade and the support member.

7. The hub assembly of claim 6, wherein the blade coupling assembly further includes an inner housing annularly disposed about a portion of the support member, and wherein the inboard end portion includes an outer housing coupled to the rotor blade and annularly disposed about at least part of the inner housing, the outer housing being rotatably coupled to the inner housing by the annular bearing device, the engagement portion being adapted to engage the outer housing.

8. The hub assembly of claim 7, wherein the outer housing includes an inboard side surface, the engagement portion of the flexible member being adapted to engage the inboard side surface of the outer housing.

9. The hub assembly of claim 6, wherein the annular bearing device comprises a rolling element bearing device.

10. The hub assembly of claim 6, wherein the flexible member comprises a plate member having an aperture disposed therethrough, the support member being disposed through the aperture.

11. The hub assembly of claim 6, wherein the flexible member comprises a plate member having at least two outwardly extending engagement portions.

12. The hub assembly of claim 6, wherein the plurality of support members comprises four support members.

13. A method of operating a vertical lift rotary aircraft, comprising:
    providing a hub assembly having a plurality of elongated, approximately radially-disposed support members, and a plurality of rotor blades, each rotor blade having an inboard end portion and being operatively coupled to a corresponding one of the support members;
    rotating the hub assembly to generate lift using the plurality of rotor blades; and
    resisting a bending of at least one of the support members and the rotor blades using a flexible member, the flexible member including an engagement portion adapted to engage the inboard end portion of the corresponding rotor blade and to at least partially relax a side force resulting from the bending of at least one of the rotor blades and the support members.

14. The method of claim 13, wherein each rotor blade has an inboard end portion that includes an outer housing operatively coupled to the rotor blade, the engagement portion being adapted to engage the outer housing.

15. The method of claim 14, wherein each rotor blade is rotatably coupled to a corresponding one of the support members by a blade coupling assembly having an inner housing annularly disposed between the support member and the outer housing, the inner housing being rotatably coupled to the outer housing by an annular bearing device.

16. The method of claim 13, wherein each rotor blade is rotatably coupled to a corresponding one of the support members.

17. The method of claim 13, wherein resisting a bending of at least one of the support members and the rotor blades includes resisting a bending using a plate member having at least two outwardly extending engagement portions.

18. A hub assembly for a vertical lift rotary aircraft, comprising:
   a plurality of elongated, approximately radially-disposed support members;
   a plurality of rotor blades, each rotor blade being operatively coupled to a corresponding one of the support members by a blade coupling assembly, wherein at least one of the blade coupling assemblies includes:
      a first bearing assembly including a thrust bearing device coupled between the support member and the rotor blade; and
      a second bearing assembly including an annular bearing device coupled between the support member and the rotor blade.

19. The hub assembly of claim 18, further comprising a plurality of tension members, each tension member coupled to a respective one of a respective support member, wherein the first bearing assembly includes:
   a first race annularly coupled to the corresponding tension member; and
   a second race annularly disposed about the corresponding tension member and coupled to the corresponding rotor blade, the second race being radially-inwardly spaced from the first race and coupled to the first race by the thrust bearing device.

20. The hub assembly of claim 18, wherein the second bearing assembly includes:
   a bushing annularly disposed about the support member;
   a third race disposed about the bushing; and
   a fourth race annularly disposed about the third race and radially-outwardly spaced apart from the third race and coupled to the third race by the annular bearing device.

21. The hub assembly of claim 20, wherein the bushing comprises a plurality of concentrically-disposed elastomeric layers.

22. The hub assembly of claim 18, wherein the thrust bearing device comprises an annular roller bearing assembly and wherein the annular bearing device comprises a pair of needle bearing devices.

23. The hub assembly of claim 18, wherein at least one of the support members includes a hollowed out cavity therethrough, and an elongated, approximately radially-extending tension member extending through the cavity.

24. The hub assembly of claim 23, wherein the thrust bearing device of the first bearing assembly is coupled between the tension member and the rotor blade at a radially-outward location from an outboard end of the support member; and the annular bearing device of the second bearing assembly is coupled between the support member and the rotor blade proximate the outboard end of the support member.

25. A method of operating a vertical lift rotary aircraft, comprising:
   providing a hub assembly including:
      a plurality of elongated, approximately radially disposed support members;
      a plurality of rotor blades, each rotor blade being operatively coupled to a corresponding one of the support members by a blade coupling assembly, at least one blade coupling assembly including:
         a first bearing assembly including a thrust bearing device coupled between the support member and a corresponding one of the rotor blades; and
         a second bearing assembly including an annular bearing device coupled between the support member and the corresponding one of the rotor blades;
   rotating the hub assembly to generate lift using the plurality of rotor blades;
   rotating the corresponding one of the rotor blades about the corresponding support member using the thrust bearing device and the annular bearing device; and
   carrying a centrifugal load with the thrust bearing device.

26. The method of claim 25, further comprising a plurality of tension members, each tension member coupled to a respective one of a respective support member, wherein providing a hub assembly includes providing a hub assembly wherein the first bearing assembly includes:
   a first race annularly coupled to the tension member; and
   a second race annularly disposed about the tension member and coupled to the rotor blade, the second race being radially-inwardly spaced from the first race and coupled to the first race by the thrust bearing device.

27. The method of claim 25, wherein providing a hub assembly includes providing a hub assembly wherein the second bearing assembly includes:
   a bushing annularly disposed about the support member;
   a third race disposed about the bushing; and
   a fourth race annularly disposed about the third race and radially-outwardly spaced apart from the third race and coupled to the third race by the annular bearing device.

28. The method of claim 27, wherein providing a hub assembly includes providing a hub assembly wherein the bushing comprises a plurality of concentrically-disposed elastomeric layers.

29. The method of claim 25, wherein providing a hub assembly includes providing a hub assembly wherein the thrust bearing device comprises an annular roller bearing assembly.

30. The method of claim 25, wherein providing a hub assembly includes providing a hub assembly wherein at least one of the support members has a hollowed out cavity therethrough, and an elongated, approximately radially-extending tension member extending through the cavity.

31. The method of claim 30, wherein providing a hub assembly includes providing a hub assembly wherein the thrust bearing device of the first bearing assembly is coupled between the tension member and the rotor blade at a radially-outward location from an outboard end of the support member; and the annular bearing device of the second bearing assembly is coupled between the support member and the rotor blade proximate the outboard end of the support member.

* * * * *